United States Patent
Akbulut et al.

(10) Patent No.: US 9,292,420 B2
(45) Date of Patent: Mar. 22, 2016

(54) COLLABORATIVE COMPUTER AIDED TEST PLAN GENERATION

(71) Applicant: International Business Machines Corporation, Armonk, NY (US)

(72) Inventors: Muhtar B. Akbulut, Waban, MA (US); Mario A. Maldari, Longmont, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 14/189,650

(22) Filed: Feb. 25, 2014

(65) Prior Publication Data
US 2015/0242304 A1    Aug. 27, 2015

(51) Int. Cl.
G06F 11/36    (2006.01)
G06F 3/0484   (2013.01)

(52) U.S. Cl.
CPC ........ G06F 11/3684 (2013.01); G06F 3/04842 (2013.01)

(58) Field of Classification Search
CPC . G06F 11/28; G06F 11/3688; G06F 11/3684; G06F 11/3664; G06F 11/3672; G06F 11/3696; G06F 11/263; G06F 11/3676; G06F 11/3692
See application file for complete search history.

(56) References Cited

U.S. PATENT DOCUMENTS

| | | | | |
|---|---|---|---|---|
| 6,332,211 | B1 * | 12/2001 | Pavela | 717/130 |
| 6,804,709 | B2 * | 10/2004 | Manjure et al. | 709/220 |
| 7,337,432 | B2 | 2/2008 | Dathathraya et al. | |
| 8,230,401 | B2 * | 7/2012 | Branca et al. | 717/135 |
| 8,479,164 | B2 * | 7/2013 | Becker et al. | 717/124 |
| 8,954,931 | B2 * | 2/2015 | Wefers et al. | 717/124 |
| 2008/0010542 | A1 * | 1/2008 | Yamamoto et al. | 714/38 |
| 2008/0215921 | A1 * | 9/2008 | Branca et al. | 714/38 |
| 2009/0235172 | A1 * | 9/2009 | Gandhi et al. | 715/733 |
| 2012/0266137 | A1 * | 10/2012 | Alexander et al. | 717/124 |
| 2013/0117611 | A1 * | 5/2013 | Chakraborty et al. | 714/33 |
| 2015/0242305 | A1 | 8/2015 | Akbulut et al. | |

OTHER PUBLICATIONS

"Method for Analyzing Related Defects in a Change Request System to Classify Problematic Systems and Features," [online] IP.com Prior Art Database, Aug. 9, 2012, Technical Disclosure IPCOM000220639D, retrieved from the Internet: <http://ip.com/IPCOM/000220639>, 4 pg.

"Creating Automated Test Case / Test Plan—Jazz Forum," [online] IBM Developerworks, IBM Corporation, May 23, 2012, [retrieved Dec. 4, 2013], retrieved from the Internet: <https://jazz.net/forum/questions/77271/creating-automated-test-case-test-plan>, 1 pg.

* cited by examiner

*Primary Examiner* — Nadeem Iqbal
(74) *Attorney, Agent, or Firm* — Cuenot, Forsythe & Kim, LLC

(57) ABSTRACT

Arrangements described herein relate to generation of test plans. A list of test case selection criteria can be presented to each of a plurality of stakeholders. At least one user input is received from each of the plurality of stakeholders selecting at least one test case selection criterion from the list of test case selection criteria and, for each selected test case selection criterion, assigning a criterion priority. Test cases, which correspond to the selected test case selection criteria, can be automatically selected to include in a candidate test plan. A candidate priority can be automatically assigned to each test case selected to be included in the candidate test plan. The processor selects the test cases to include in the candidate test plan and assigns the candidate priorities to the selected test cases based on processing the criterion priorities assigned to the selected test case selection criteria by the stakeholders.

11 Claims, 5 Drawing Sheets

US 9,292,420 B2

COLLABORATIVE COMPUTER AIDED TEST PLAN GENERATION

BACKGROUND

Arrangements described herein relate to generation of test plans.

A test plan is an artifact that contains a collection of test cases configured to test a particular type of application and/or service executing in a data processing system. Oftentimes the test cases are grouped into themes, which define the high-level aspects for the test plan and guide the test case selection criteria. The ultimate goal of a test plan is to identify the best set of test cases to execute such that motivating themes are covered with the available test resources.

SUMMARY

A system includes a processor programmed to initiate executable operations. The executable operations include presenting to each of a plurality of stakeholders a list of test case selection criteria. At least one user input can be received from each of the plurality of stakeholders selecting at least one test case selection criterion from the list of test case selection criteria and, for each selected test case selection criterion, assigning a criterion priority. Test cases, which correspond to the selected test case selection criteria, can be automatically selected to include in a candidate test plan. Further, a candidate priority can be automatically assigned to each test case selected to be included in the candidate test plan. The test cases are selected to include in the candidate test plan and the candidate priorities are assigned to the selected test cases based on processing the criterion priorities assigned to the selected test case selection criteria by the stakeholders.

A computer program includes a computer readable storage medium having program code stored thereon. The program code is executable by a processor to perform a method. The method includes presenting, by the processor, to each of a plurality of stakeholders a list of test case selection criteria. At least one user input can be received, by the processor, from each of the plurality of stakeholders selecting at least one test case selection criterion from the list of test case selection criteria and, for each selected test case selection criterion, assigning a criterion priority. Test cases, which correspond to the selected test case selection criteria, can be automatically selected, by the processor, to include in a candidate test plan. Further, a candidate priority can be automatically assigned, by the processor, to each test case selected to be included in the candidate test plan. The processor selects the test cases to include in the candidate test plan and assigns the candidate priorities to the selected test cases based on processing the criterion priorities assigned to the selected test case selection criteria by the stakeholders.

DETAILED DESCRIPTION

Figure 1:
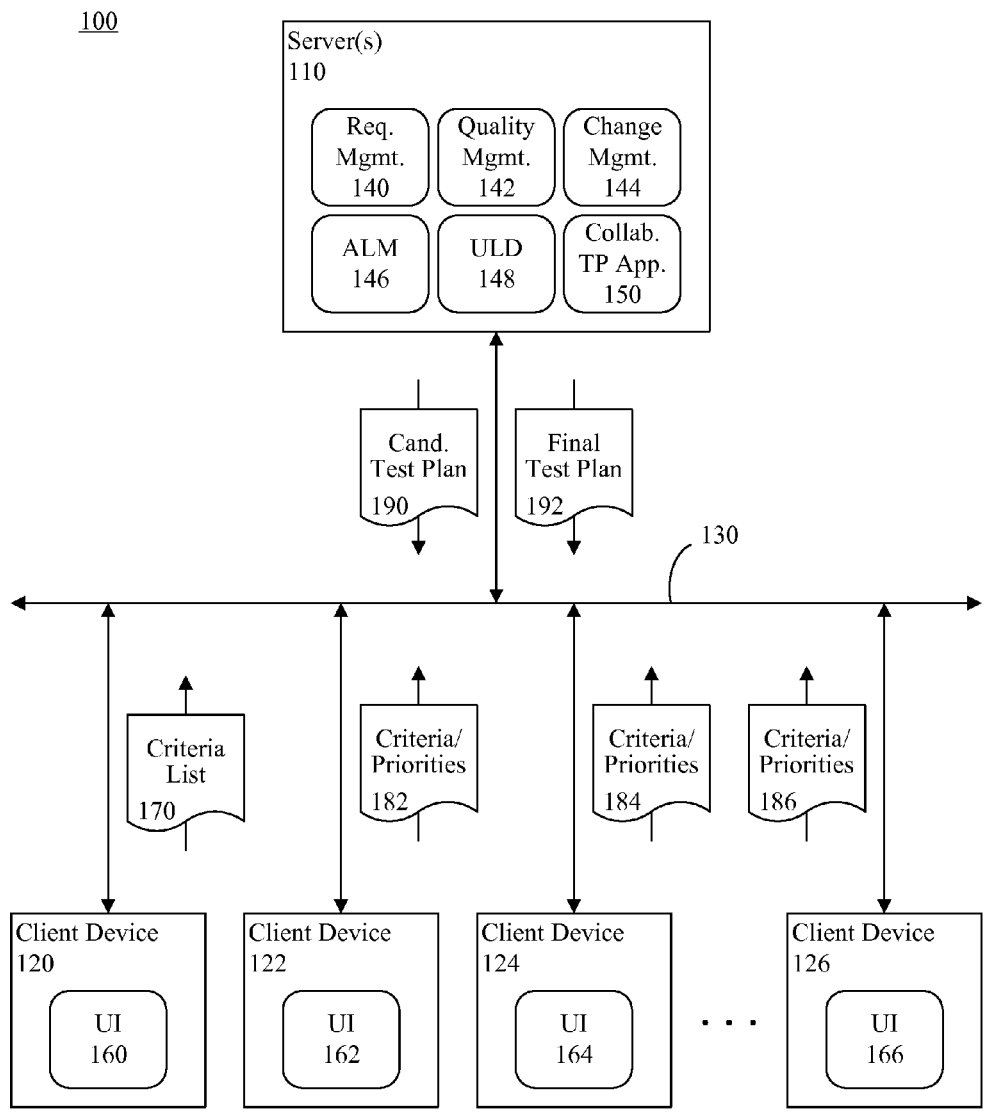
FIG. 1 is a block diagram illustrating an example of a computing environment.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to the generation of test plans and, more particularly, to a collaboration environment in which stakeholders in a test plan provide user inputs regarding prioritization of test case selection criteria the stakeholders believe are important to the test plan. Based on the user inputs, test cases are automatically selected to be included in a candidate test plan and candidate priorities are automatically assigned to the test cases using suitable algorithms executed by a processor. In the collaboration environment stakeholders also can modify and/or edit freeform text associated with the candidate test plan.

Several definitions that apply throughout this document now will be presented.

As defined herein, the term "test case" means a set if conditions and/or variables configured to be input to a system to determine whether the system is functioning properly. In this regard, a system can be an application or other software, a device or group of devices, or any other system that may process a set of conditions and/or variables.

As defined herein, the term "test plan" means an artifact that contains a collection of test cases. In one arrangement, the test cases can be grouped into themes, and free-form document sections in the test plan can provide context for these themes. The themes can be driven from any Application Lifecycle Management (ALM) domain. For example, a requirements management motivated theme can include all new features delivered at a particular milestone, and a quality management motivated theme can include all high-severity regressions and clustered deployment test cases.

As defined herein, the term "test case selection criterion" means a criterion for selecting test cases for a test plan.

As defined herein, the term "test case selection criteria" means criteria for selecting test cases for a test plan.

As defined herein, the term "criterion priority" means a priority assigned to a test case selection criterion by a stakeholder that indicates a relative importance of the test case selection criterion, as perceived by the stakeholder, to a test plan.

As defined herein, the term "collaborative priority" means a priority automatically assigned to a test case selection criterion based on at least one criterion priority assigned to the test case selection criterion by at least one stakeholder.

As defined herein, the term "candidate priority" means a priority assigned to a test case that indicates a relative importance, as automatically determined, of the test case to a test plan.

As defined herein, the term "free-form content" means unstructured data such as text, tables, images and files.

As defined herein, the term "theme" means a plurality of test cases that are grouped together based on a context that is common to the test cases. The context can be, for example, a particular test case selection criterion with which each of the test cases are associated. A particular test case can be included in one or more themes.

As defined herein, the term "story" means a requirement specified by a user for a milestone or iteration of an application or system.

As defined herein, the term "stakeholder" means a person (i.e., a human being) having an interest in the execution of a test plan.

As defined herein, the term "test lead person" means a stakeholder who is assigned a lead role on generating a test plan.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), an application specific integrated circuit (ASIC) and a controller.

As defined herein, the term "automatically" means without user intervention.

As defined herein, the term "user input" means an input by a person (i.e., a human being) into a processing system via a user interface.

As used herein, the term "real time" means a level of processing responsiveness that a user or system senses as sufficiently immediate for a particular process or determination to be made, or that enables the processor to keep up with some external process.

FIG. 1 is a block diagram illustrating an example of a computing environment 100. The computing environment 100 can include one or more servers 110 and a plurality of client devices 120, 122, 124, 126 communicatively linked via a communication network 130. A server 110 is implemented as a processing system including at least one processor and memory. Each client device 120-126 also is implemented as a processing system including at least one processor and memory. Examples of the client devices include, but are not limited to, workstations, desktop computers, mobile computers (e.g., laptop computers, notebook computers, netbook computers, tablet computers, etc.), smart phones, personal digital assistants, and the like.

The communication network 130 is the medium used to provide communications links between the various server(s) 100 and client devices 120-126 connected together within the computing environment 100. The communication network 130 may include connections, such as wire, wireless communication links, or fiber optic cables. The communication network 130 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

The server(s) 110 can include a requirements management (RM) application 140, a quality management (QM) application 142 and a change management (CM) application 144, each of which are known to those skilled in the art. In this regard, the RM application 140, QM application 142 and CM application 144 can be executed on the same server 110 or executed on different servers 110. The RM application 140, QM application 142 and CM application 144 each can store respective data to one or more suitable databases.

The server(s) 110 also can include an application life cycle management (ALM) framework 146 configured to link data from the RM application 140, QM application 142 and CM application 144. The server(s) 110 further can include a unified link datastore (ULD) 148 that interfaces with the ALM framework 146 to retrieve data from the RM application 140, QM application 142 and CM application 144, as well as any other applications that may be pertinent to generating test plans, and create an index of the data in a suitable database so that the data can be easily queried. The indexed data, for example, can include important artifacts from all applications 140-144 linked by the ALM framework 146. Accordingly, the ULD 148 can allow queries to be run across the multiple applications 140-144.

The server(s) 110 also can include a collaborative test plan generation application (hereinafter "collaborative application") 150. The collaborative application 150 can include a variety of user interface views and menus presented to stakeholders via the client devices 120-126 to facilitate stakeholder collaboration on generating test plans, as will be described in further detail. In this regard, each of the client devices 120-126 can include a respective user interface 160, 162, 164, 166 via which the user interface views and menus are presented. The user interfaces 160-166 can be implemented as web browsers or other client-side applications suitable configured to present the user interface views and menus and receive user inputs from the stakeholders.

In operation, via the user interface 160 of the client device 120, a stakeholder, such as test lead person, can initiate a collaborative test plan request and specify a list of stakeholders who are invited to collaborate in generating the test plan for testing a particular system, such as an application or other software, a device or group of devices, or any other system that may be tasked with processing test cases in accordance with a test plan to confirm the system is properly functioning. The test lead person also can generate a criteria list 170 containing criteria potentially relevant to the test plan, which can be communicated from the client device 120 to the collaborative application 150.

In addition, the test lead person can pre-configure queries to select test cases corresponding to criteria included in the criteria list 170. Such queries can be executed to select test cases for a candidate test plan, for example by interfacing with the ULD 148 to identify the appropriate test cases and retrieve the test cases from the RM, QM and CM applications, as well as any other suitable applications, as will be described. In one arrangement, the queries can be configured to query test cases associated with themes corresponding to the criteria. In this regard, the test case selection criteria can be specific to the ALM framework 146. Accordingly, the ALM framework 146 and ULD 148 can be leveraged to quickly map the test case selection criteria to the test case queries. The test lead person also can specify a maximum number of test cases to be included in the candidate test plan and/or a maximum number of test cases to be selected to satisfy each particular test case selection criterion.

Responsive to the test lead person initiating the collaborative test plan request, the collaborative application 150 can invite each of the specified stakeholders to participate in generating the test plan. For example, the collaborative application 150 can communicate messages (e.g., emails, text messages or the like) to the specified stakeholders that direct the stakeholders to a criteria prioritization specification 200 (FIG. 2) that is generated by the collaborative application 150 based on the criteria list 170. The invitations can include, for example, hyperlinks or uniform resource identifiers (URIs) (e.g., uniform resource locators (URLs)) to the criteria prioritization specification 200. In one arrangement, each invited stakeholder can be provided an option to accept or decline the invitation.

Figure 2:
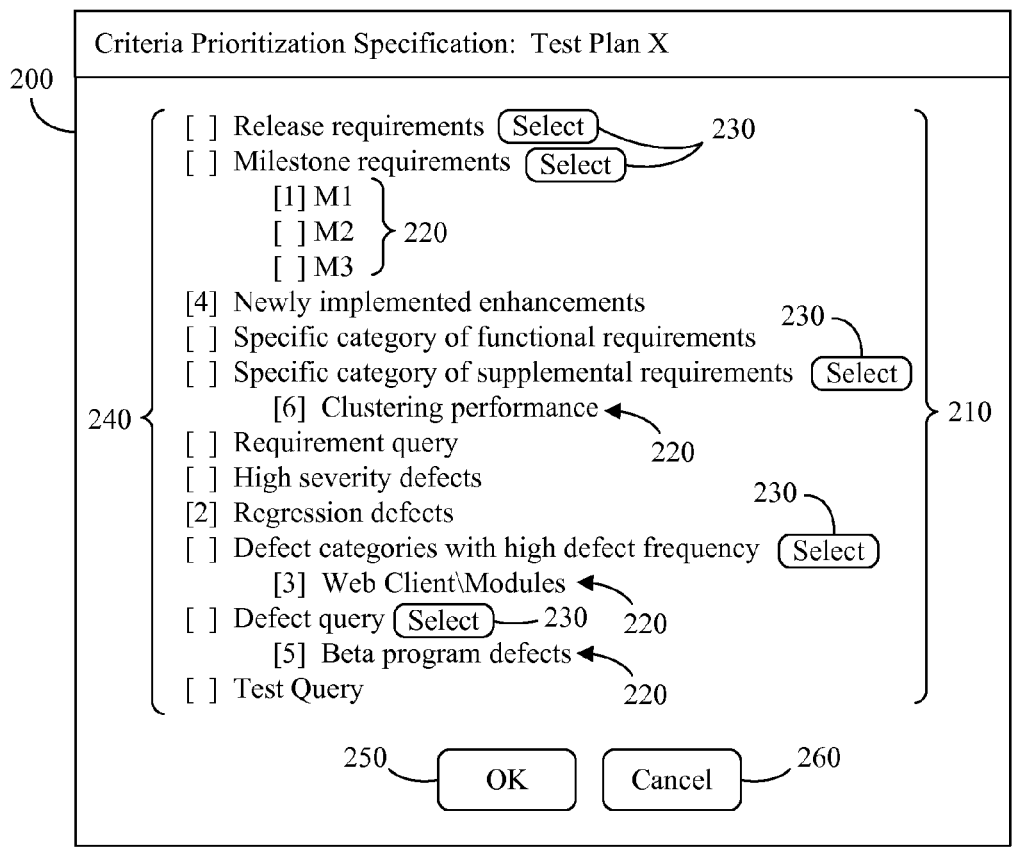
FIG. 2 depicts an example of a criteria prioritization specification presented via a user interface.

FIG. 2 depicts an example of the criteria prioritization specification 200, which may be presented to the stakeholders via the respective user interfaces 162-166. The criteria prioritization specification 200 can provide a listing of each test case selection criterion 210 added to the criteria list 170 (FIG. 1) by the test lead person or proposed by one or more stakeholders. Further, the criteria prioritization specification 200 can include, for each test case selection criterion 210 associated with one or more subcategories of criteria 220, a respective selectable control 230 (e.g., an icon, button or the like) that, when selected, shows the criteria 220 in the subcategories associated with the respective criteria 210. The criteria prioritization specification 200 also can include for each test case selection criterion 210, 220 a priority control 240 via which a stakeholder can select the test case selection criterion 210, 220 if the stakeholder believes the test case selection criterion 210, 220 is pertinent to a candidate test plan and assign a criterion priority to the selected test case selection criterion 210, 220. In this regard, only test case selection criteria 210, 220 which are assigned a criterion priority need be deemed to have been selected by the stakeholder. Once the stakeholder has finished selecting one or more test case selection criteria 210, 220 by assigning criterion priorities to the test case selection criteria 210, 220, the stakeholder can select a control 250 to accept the selections/priorities. The stakeholder also may select a control 260 to cancel the test case selection criteria 210, 220 selection and priority assignment.

Figure 3:
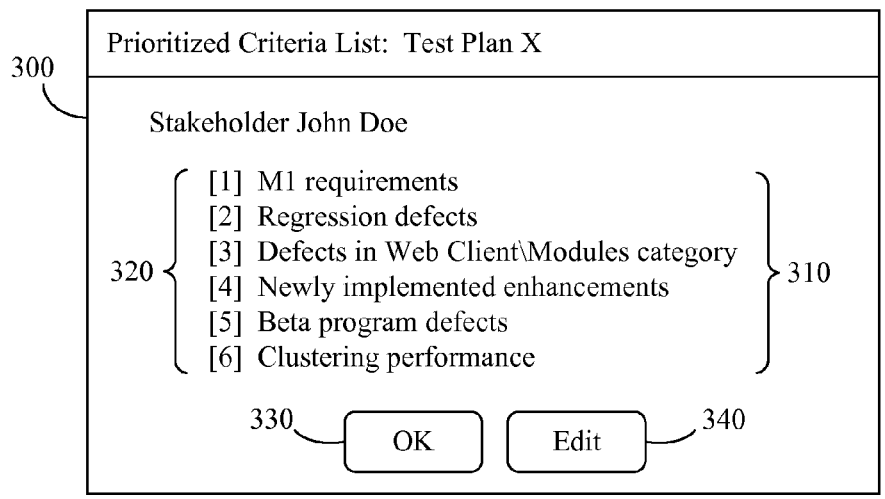
FIG. 3 depicts an example of a prioritized list of criteria presented via a user interface.

Responsive to the stakeholder selecting to accept the test case selection criteria/priority selections (e.g., by selecting the control 250), a prioritized list 300 of the test case selection criteria 210, 220 selected by the stakeholder can be presented to the stake holder via a respective user interface 162-166, for example as presented in the prioritized list 300 of criteria in depicted FIG. 3. The prioritized list 300 can include each of the test case selection criteria 310 selected by the stakeholder and the respective criterion priorities 320 assigned to the selected test case selection criteria 310 by the stakeholder. In this regard, the selected test case selection criteria 320 can be presented in the prioritized list 300 in an order corresponding to the assigned criterion priorities 320. The stakeholder can select a control 330 to accept the prioritized list 300, or select a control 340 to edit the prioritized list, in which case the criteria prioritization specification 200 of FIG. 2 can again be presented to the stakeholder to allow the user to change the criteria selections and/or priorities.

Referring to FIGS. 1 and 2, when a stakeholder using the client device 122 accepts the prioritized list 300 of criteria of FIG. 3, the criteria/priorities 182 selected by the stakeholder can be communicated to the collaborative application 150. Similarly, when a stakeholder using the client device 124 accepts a respective prioritized list, the criteria/priorities 184 selected by the stakeholder can be communicated to the collaborative application 150, and when a stakeholder using the client device 126 accepts a respective prioritized list, the criteria/priorities 186 selected by the stakeholder can be communicated to the collaborative application 150. Optionally, the stakeholder who is the test lead person also can select criteria/priorities and communicate them to the collaborative application 150.

Responsive to the collaborative application 150 receiving all, or minimum number, of the criteria/priorities 182-186 selected by the stakeholders, the collaborative application 150 can process the selected criteria/priorities 182-186 to automatically create a candidate test plan 190. In illustration, the collaborative application 150 can execute a prioritization algorithm that assigns a collaborative priority to each of the selected test case selection criteria based on the criterion priorities assigned to the selected criteria by the stakeholders. In illustration, the prioritization algorithm can identify each test case selection criterion selected by at least one stakeholder and, for each test case selection criterion, average the priorities assigned to the test case selection criterion by the stakeholders to determine the collaborative priority to be assigned to that test case selection criterion. For each stakeholder that did not select a particular test case selection criterion which was selected by at least one other stakeholder, a very low priority can be assigned to the test case selection criterion on behalf of the stakeholder who did not select the test case selection criterion. This can facilitate averaging of the stakeholder assigned criterion priorities to arrive at the collaborative priority. For example, a priority of 50, 100 or 1000 can be assigned to the test case selection criterion on behalf of each of the stakeholders that did not choose the test case selection criterion.

The collaborative application 150 can rank the test case selection criteria to correspond to the collaborative priorities and select one or more of the test case selection criteria 210, 220 having the highest collaborative priorities for inclusion in the candidate test plan 190. For the test case selection criterion 210, 220 having the highest collaborative priority (e.g., lowest average priority number), the collaborative application 150 can automatically execute a query corresponding to that test case selection criterion 210, 220 to select test cases to include in the candidate test plan. As noted, such query can interface with the ULD 148 to select test cases from the RM application 140, the QM application 142, the CM application 144 and/or any other application that may include relevant test cases. For the test case selection criterion 210, 220 having the next highest collaborative priority, the collaborative application 150 can automatically execute a query corresponding to that test case selection criterion to select test cases to include in the candidate test plan, and so on. The process can continue until the collaborative application 150 has selected the maximum number of test cases to be included in the candidate test plan. If the maximum number of test cases is not been reached, the process can continue until test cases for all test case selection criteria 210, 220 identified by the stakeholders have been selected. In one arrangement, the number of test cases selected for each test case selection criterion 210, 220 can be limited to a maximum number, for example a maximum number of test cases specified by the test lead person.

The collaborative application 150 also can assign candidate priorities to the selected test cases based on a suitable algorithm. In illustration, the collaborative application 150 can, for each selected test case, identify which test case selection criterion the test case is associated and identify the collaborative priority assigned to the test case selection criterion. Test cases associated with a test case selection criterion having a high collaborative priority can be assigned high candidate priorities, while test cases associated with a test case selection criterion having a low collaborative priority can be assigned low candidate priorities. Moreover, if a test case is associated with a plurality of test case selection criterion, such test case can be assigned a candidate priority that is at least as high as the collaborative priority assigned to the highest priority test case selection criterion with which the test case is associated. The algorithm that assigns the candidate priorities to test cases also can process other information when assigning the candidate priorities. For example, the algorithm can process information related to how often test cases are used in test plans, metadata assigned to the test cases, etc.

Responsive to the test cases being selected and candidate priorities being assigned to the selected test cases, the collaborative application 150 can generate the candidate test plan 190, which can include the selected test cases with the assigned candidate priorities. The collaborative application 150 also can include in the candidate test plan 190 free-form content associated with the test case selection criteria for which the test cases are selected. One example of the free-form content is a milestone requirement, also known as a story, associated with a milestone criterion. A milestone requirement is a requirement specified by a stakeholder for a milestone or iteration of a system. Other free-from content can relate to features, use cases, notes related to a criterion, notes related to a test case, etc. The free-form content can facilitate review of the candidate test plan 190 by the stakeholders.

Figure 4:
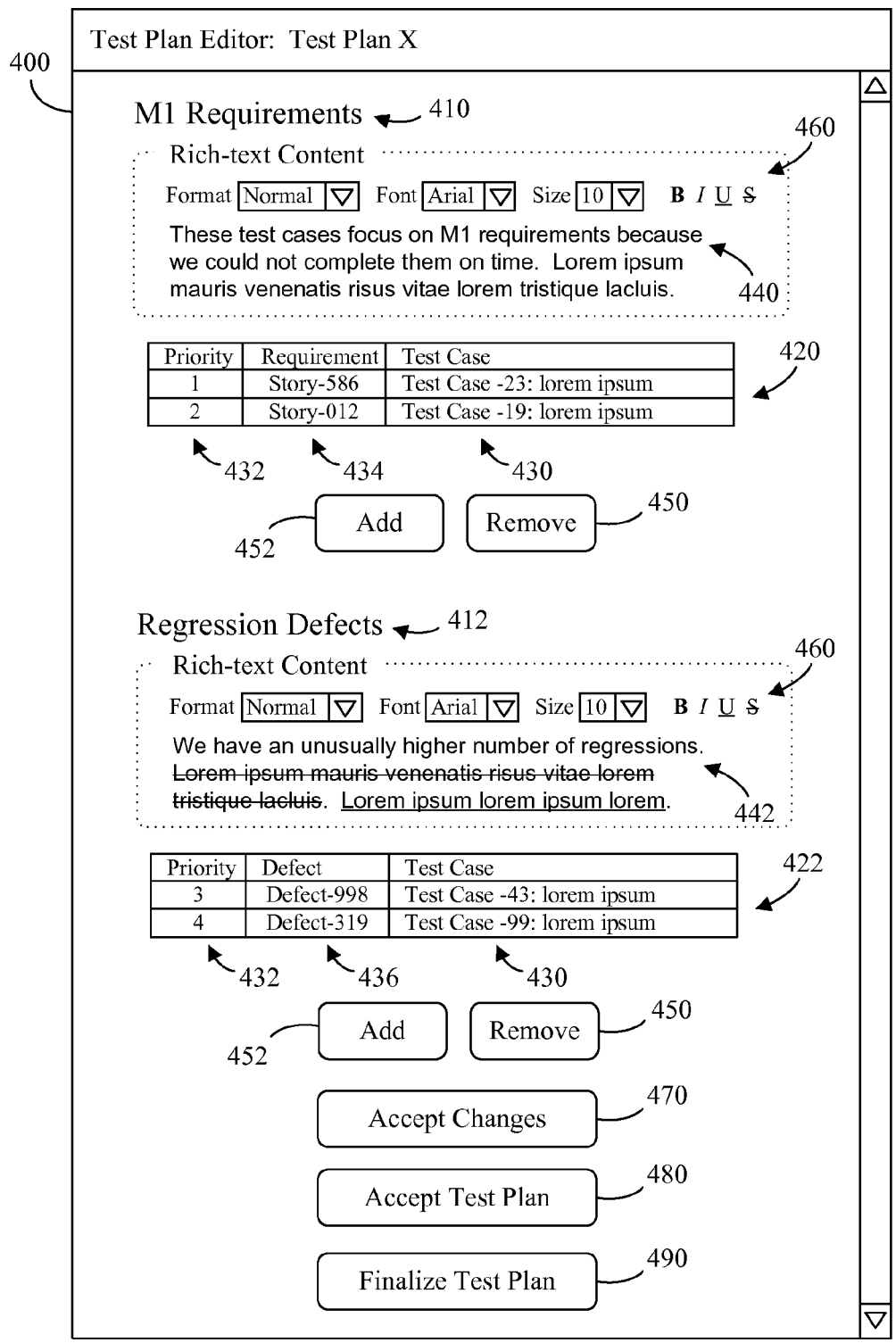
FIG. 4 depicts an example of a test plan editor presented via a user interface.

FIG. 4 depicts an example of a test plan editor 400, which can be presented by the collaborative application 150 to the test lead person and other stakeholders via respective user interfaces 160-166 to present the candidate test plan 190 (FIG. 1). Referring FIGS. 1 and 4, the test plan editor 400 can present each of the test case selection criterion 410, 412 selected for the candidate test plan 190 and, for each selected criterion 410, 412, respective test cases 420, 422 selected for the candidate test plan 190. The selected test case selection criteria 410, 412 can be presented in the test plan editor 400 in an order corresponding to the collaborative priorities assigned to the test case selection criteria 410, 412. Further, the selected test cases 420, 422 can be presented with the respective test case selection criteria 410, 412 to which the respective test cases 420, 422 correspond. In illustration, under each selected test case selection criterion 410, 412, the respective test cases 420, 422 for that test case selection criterion 410, 412 can be presented in a respective table that identifies the respective test cases 420, 422 using a suitable identifier 430, the candidate priority 432 assigned to each respective test case 420, 422, a requirement 434 each respective test case 420, 422 is configured to test and/or a defect 436 for which each respective test case 420, 422 is configured to test.

Further, the test plan editor 400 can present with the respective test case selection criteria 410, 412 free-form content 440, 442. In illustration, under each selected test case selection criterion 410, 412, the respective free-form content 440, 442 for that test case selection criterion 410, 412 can be presented. Optionally, when a stakeholder selects a particular test case 420, 422, the free-form content 440, 442 that is presented in the test plan editor 400 can be changed to free-form content associated with the particular test case 420, 422. As noted, the free-form content 440, 442 can be free-form content that pre-exists or free-form content that is generated by the collaborative application 150 based on metadata associated with the test case selection criteria 410, 412 and/or test cases 420, 422.

Via the test plan editor 400, the test lead person and/or other stakeholders can revise the candidate test plan 190. In one arrangement, permission to revise the candidate test plan 190 can be limited to the test lead person. In another arrangement, permission to revise the candidate test plan 190 can be limited to stakeholders having appropriate permissions and/or security levels and/or the types of changes made to the candidate test plan 190 by stakeholders can be limited based on stakeholder permissions and/or security levels. Changes made by stakeholders not having appropriate permissions and/or security levels to make such changes can be indicated as proposed revisions. Such permissions and/or security levels can be established by an administrator, such as the test lead person, in the collaborative application 150 or the test plan editor 400.

To suggest a revision for the candidate test plan 190, a stakeholder can enter a user input to select a particular test case selection criterion 410, 412 and enter a user input to select a control 450 to remove the particular test case selection criterion 410, 412 and/or enter a user input to select a control 450 to add another test case selection criterion (not shown). Similarly, the stakeholder can enter a user input to select a particular test case 420, 422 and enter a user input to select the control 450 to remove the particular test case 420, 422 and/or enter a user input to select the control 450 to add another test case (not shown). The stakeholder also can enter user inputs to change the candidate priorities 432 assigned to the test cases 420, 422. Further, the stakeholder can edit the free-form content 440-422 associated with test case selection criteria 410, 412 and/or test cases 420, 422, or add free-form content 440, 442. In illustration, the stakeholder can add and/or delete text in the free-form content 440, 442. Optionally, text effects, such as strikethroughs, underlining, highlighting, etc. can be automatically applied by the test plan editor 400 to the free-form content 440, 442 to indicate text that is deleted and/or added to the free-form content 440, 442 by the stakeholder. In one aspect, the test plan editor 400 can present to the stakeholder text formatting tools 460 which the stakeholder can use to apply text effects to the free-form content 440, 442. The stakeholder can, for example, change the format of the text, the font, the size of the text, bold text, italicize text, underline text, add strikethrough to text, and the like.

When the stakeholder is finished proposing changes for revising the candidate test plan 190, the stakeholder can enter a user input to select a control 470 to accept the suggested changes. Further, the collaborative application 150 can send a message to the test lead person indicating that changes to the candidate test plan 190 have been suggested, and the stakeholder proposing the changes. When the test lead person accesses the candidate test plan 190 using the test plan editor 400, the test plan editor 400 can present the suggested changes in the candidate test plan 190 and, optionally, the stakeholder who proposed the changes. The test plan editor 400 can be configured with options allowing the test lead person to accept and deny the proposed changes. When the test lead person completes accepting/denying proposed changes, the collaborative application 150 can send a message to the stakeholder who proposed such changes indicating which changes were accepted and/or which changes were denied. The test lead person also add or remove test case selection criteria 410, 412 and/or test cases 420, 422 to/from the test plan, re-prioritize the test cases, and/or add or modify the free-form content 440, 442.

In the case that multiple stakeholders have provided suggestions for revising the candidate test plan 190, the collaborative application 150 can process such revisions and/or suggestions to automatically generate a suggested revision to the candidate test plan 190. For example, based on input from the stakeholders, the collaborative application 150 again can select test case selection criteria 410, 412, test cases 420, 422 and candidate priorities 432 for the selected test cases 420, 422, for example as previously described. Via the test plan editor 400, the collaborative application 150 can present the suggested revision for the candidate test plan 190 to a stakeholder, such as the test lead person, who can accept and/or deny changes provided in the suggested revision, further revise the candidate test plan 190 and/or accept the suggested revision.

In response to the candidate test plan 190 being revised, the collaborative application 150 can update the candidate test plan 190 and send respective messages to stakeholders participating in generation of the test plan that the candidate test plan 190 has been revised. Such messages can prompt the stakeholders to review the revised candidate test plan 190 via the test plan editor 400 and propose any further revisions to the candidate test plan 190 such stakeholders may desire. When a stakeholder is satisfied with the candidate test plan 190 as presented, the stakeholder can select a control 480 to accept the candidate test plan 190.

In one arrangement, responsive to each stakeholder accepting the candidate test plan 190, the collaborative application 150 can send a message to the test lead person indicating such acceptance. In another arrangement, the collaborative application 150 can send a message to the test lead person indicating collaborative acceptance of the candidate test plan 190 when each of the other stakeholders have accepted the candidate test plan 190. When the test lead person is satisfied that the candidate test plan 190 is finalized, the test lead person can enter a user input to select a control 490 in the test plan editor 400 to generate a final test plan 192 from the candidate test plan 190. Via the test plan editor 400, the test lead person also can provide resource and planning information for the final test plan 192 (e.g., the number of testers, test duration, etc.), which can be incorporated into the final test plan 192. Responsive to the final test plan 192 being generated, the collaborative application 150 can send a message to each of the stakeholders indicating that the test plan has been finalized. Further, the message can provide the stakeholders access to the final test plan 192.

The test plan editor 400 also can be used by the test lead person and/or other stakeholders to monitor implementation of the final test plan 192. In illustration, the test plan editor 400 can present the final test plan 192 and indicate, in real time, which test cases 420, 422 have been executed and which test cases 420, 422 have not yet been executed. Further, for the test cases 420, 422 that have been executed, the test plan editor 400 can indicate, in real time, whether the system has passed or failed execution of the test cases 420, 422. For example, test cases 420, 422 that pass can be indicated with a particular color of highlighting or another suitable indicator, and test cases 420, 422 that fail can be indicated with another color of highlighting or suitable indicator. Accordingly, the final test plan 192 also can serve as a test report indicating real time progress of the test cases 420, 422 as they are executed.

At this point it should be noted that the controls 450-452, 470-490 and text formatting tools 460 depicted in FIG. 4 can, but need not, be presented with the test case selection criteria 410, 412, test cases 420, 422 and free-form content 440, 442 in the test plan editor 400. For example, such controls 450-452, 470-490 and text formatting tools 460 can be presented in one or more menus (e.g., drop down menus) or in any other suitable manner.

Figure 5:
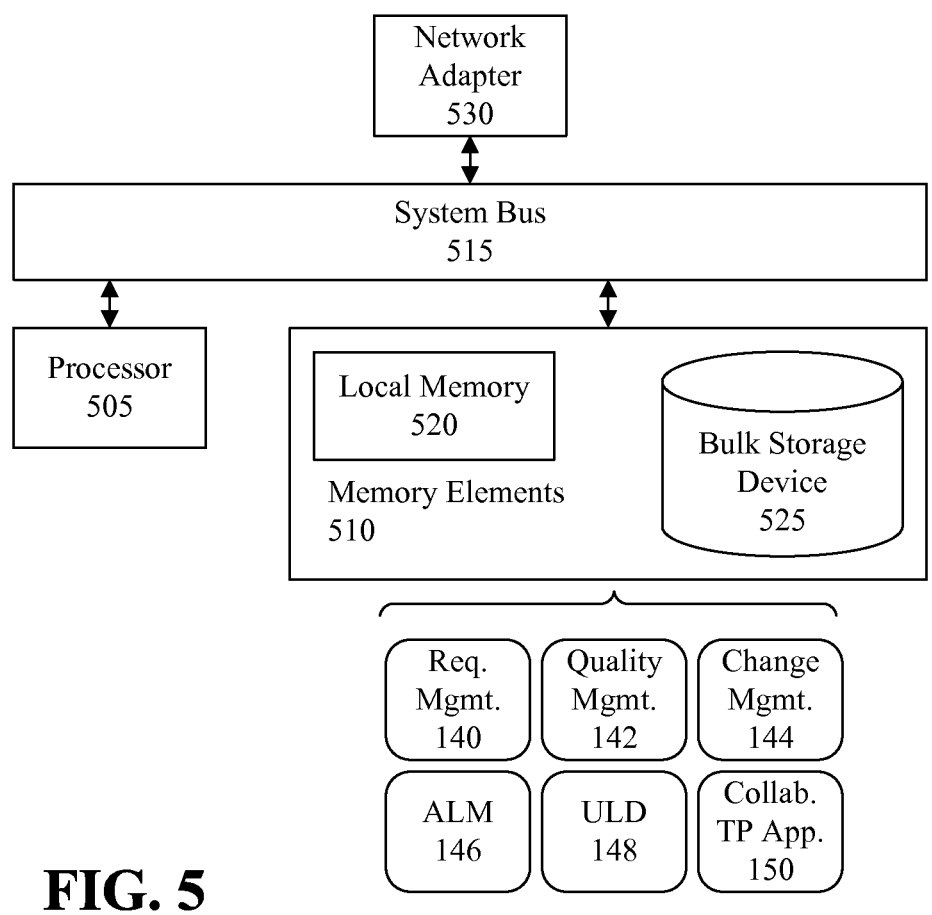
FIG. 5 is a block diagram illustrating example architecture for a data processing system.

FIG. 5 depicts a block diagram of a processing system 500 that can be implemented as a server 110 of FIG. 1.

The processing system 500 can include at least one processor 505 (e.g., a central processing unit) coupled to memory elements 510 through a system bus 515 or other suitable circuitry. As such, the processing system 500 can store program code within the memory elements 510. The processor 505 can execute the program code accessed from the memory elements 510 via the system bus 515. It should be appreciated that the processing system 500 can be implemented in the form of any system including a processor and memory that is capable of performing the functions and/or operations described within this specification. For example, the processing system 500 can be implemented as a computer, a workstation, a mobile computer, a laptop computer, a tablet computer, a smart phone, a personal digital assistant, a gaming device, an appliance, and so on.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a hard disk drive (HDD), solid state drive (SSD), or other persistent data storage device. The processing system 500 also can include one or more cache memories (not shown) that provide temporary storage of at least some program code in order to reduce the number of times program code must be retrieved from the bulk storage device 525 during execution.

One or more network adapters 530 can be coupled to processing system 500 to enable processing system 500 to become coupled to other systems, computer systems, client devices, remote printers, and/or remote storage devices through intervening private or public networks. Modems, cable modems, transceivers, and Ethernet cards are examples of different types of network adapters 530 that can be used with processing system 500.

As pictured in FIG. 5, the memory elements 510 can store one or more of the components of the server 110 of FIG. 1, namely the RM application 140, the QM application 142, the CM application 144, the ALM framework 146, the ULD 148 and/or the collaborative application 150. Being implemented in the form of executable program code, these components of the server 110 can be executed by the processing system 500 and, as such, can be considered part of the processing system 500. Moreover, the RM application 140, QM application 142, CM application 144, ALM framework 146, ULD 148 and collaborative application 150 are functional data structures that impart functionality when employed as part of the processing system 500 of FIG. 5.

Figure 6:
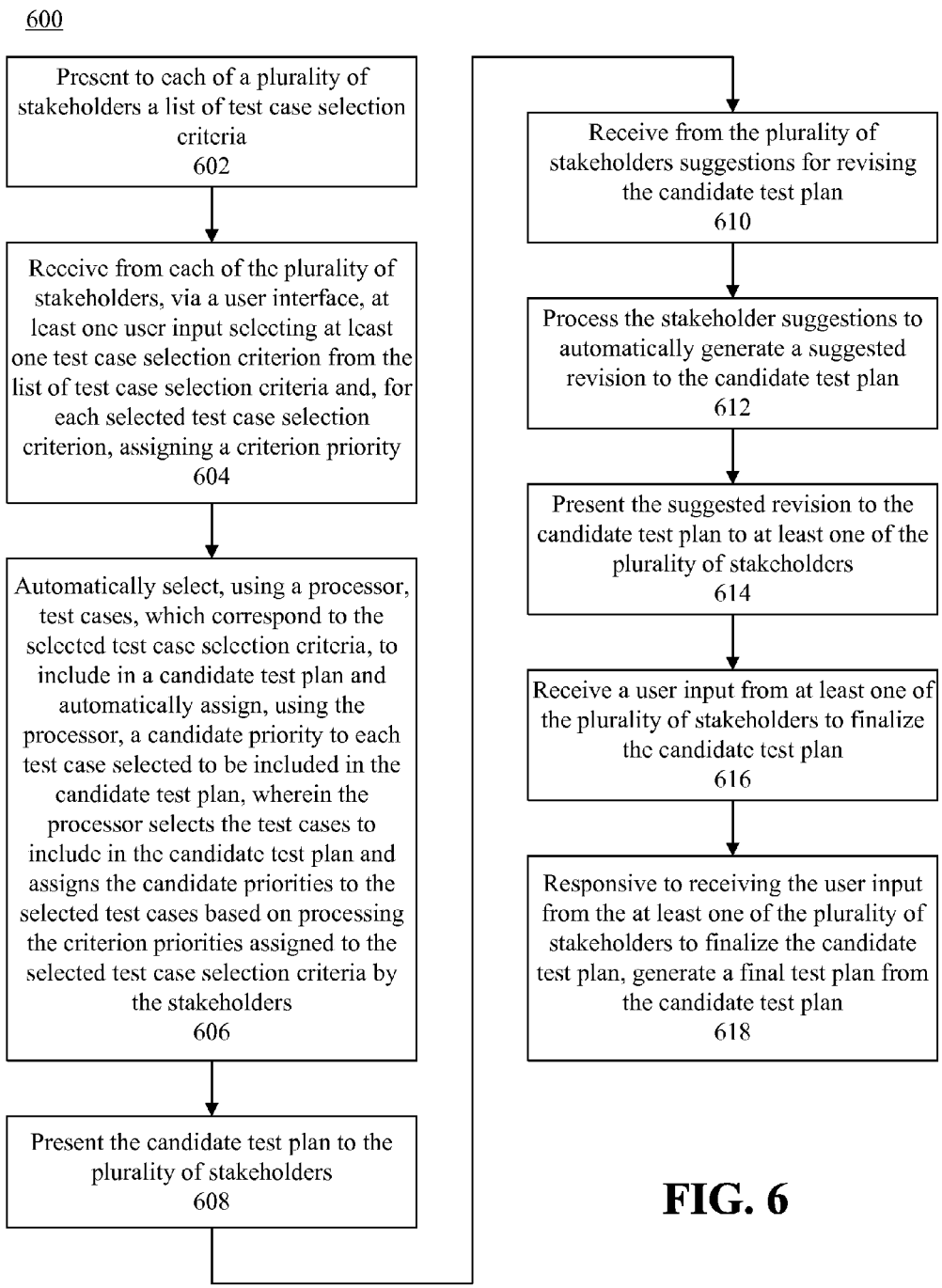
FIG. 6 is a flow chart illustrating an example of a method of generating a test plan.

FIG. 6 is a flow chart illustrating an example of a method 600 of generating a test plan. At step 602, a list of test case selection criteria can be presented to each of a plurality of stakeholders. At step 604, via a user interface, at least one user input can be received from each of the plurality of stakeholders selecting at least one test case selection criterion from the list of test case selection criteria and, for each selected test case selection criterion, assigning a criterion priority. At step 606, test cases, which correspond to the selected test case selection criteria, can be automatically selected, using a processor, to include in a candidate test plan. Further, a candidate priority can be automatically assigned, using the processor, to each test case selected to be included in the candidate test plan. The processor selects the test cases to include in the candidate test plan and assigns the candidate priorities to the selected test cases based on processing the criterion priorities assigned to the selected test case selection criteria by the stakeholders.

At step 608, the candidate test plan can be presented to the plurality of stakeholders. At step 610, suggestions for revising the candidate test plan can be received from the plurality of stakeholders. At step 612, the stakeholder suggestions can be processed to automatically generate a suggested revision to the candidate test plan. At step 614, the suggested revision to the candidate test plan can be presented to at least one of the plurality of stakeholders. At step 616, a user input from the at least one of the plurality of stakeholders can be received to finalize the candidate test plan. At step 618, responsive to receiving the user input from the at least one of the plurality of stakeholders to finalize the candidate test plan, a final test plan can be generated from the candidate test plan.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
presenting to each of a plurality of stakeholders a list of test case selection criteria;
receiving from each of the plurality of stakeholders, via a user interface, at least one user input selecting at least one test case selection criterion from the list of test case selection criteria and, for each selected test case selection criterion, assigning a criterion priority;
automatically selecting test cases, which correspond to the selected test case selection criteria, to include in a candidate test plan and automatically assigning a candidate priority to each test case selected to be included in the candidate test plan, wherein the test cases are selected to include in the candidate test plan and the candidate priorities are assigned to the selected test cases based on processing the criterion priorities assigned to the selected test case selection criteria by the stakeholders;
presenting the candidate test plan to the plurality of stakeholders;
receiving from the plurality of stakeholders suggestions for revising the candidate test plan;
processing the stakeholder suggestions to automatically generate a suggested revision to the candidate test plan; and
presenting the suggested revision to the candidate test plan to at least one of the plurality of stakeholders.

2. The system of claim 1, the executable operations further comprising:
receiving from at least a first of the plurality of stakeholders at least one suggested change for revising the candidate test plan; and
receiving from at least a second of the plurality of stakeholders a user input accepting or denying the suggested change.

3. A system comprising:
a processor programmed to initiate executable operations comprising:
presenting to each of a plurality of stakeholders a list of test case selection criteria;
receiving from each of the plurality of stakeholders, via a user interface, at least one user input selecting at least one test case selection criterion from the list of test case selection criteria and, for each selected test case selection criterion, assigning a criterion priority;
automatically selecting test cases, which correspond to the selected test case selection criteria, to include in a candidate test plan and automatically assigning a candidate priority to each test case selected to be included in the candidate test plan, wherein the test cases are selected to include in the candidate test plan and the candidate priorities are assigned to the selected test cases based on processing the criterion priorities assigned to the selected test case selection criteria by the stakeholders;
receiving a user input from at least one of the plurality of stakeholders to finalize the candidate test plan;
responsive to receiving the user input from the at least one of the plurality of stakeholders to finalize the candidate test plan, generating a final test plan from the candidate test plan;
receiving a user input from the at least one of the stakeholders providing resource or planning information for the final test plan; and
incorporating the resource or planning information into the final test plan.

4. The system of claim 3, the executable operations further comprising:
presenting the final test plan to at least one of the plurality of stakeholders and indicating in the final test plan, in real time, which of the test cases have been executed by a second system being tested using the final test plan.

5. The system of claim 4, the executable operations further comprising:

indicating in the final test plan, in real time, whether the second system being tested using the final test plan has passed or failed execution of the test cases that have been executed.

6. A computer program product comprising a computer readable storage medium having program code stored thereon, the program code executable by a processor to perform a method comprising:
presenting, by the processor, to each of a plurality of stakeholders a list of test case selection criteria;
receiving, by the processor, from each of the plurality of stakeholders, via a user interface, at least one user input selecting at least one test case selection criterion from the list of test case selection criteria and, for each selected test case selection criterion, assigning a criterion priority;
automatically selecting, by the processor, test cases, which correspond to the selected test case selection criteria, to include in a candidate test plan and automatically assigning, by the processor, a candidate priority to each test case selected to be included in the candidate test plan, wherein the processor selects the test cases to include in the candidate test plan and assigns the candidate priorities to the selected test cases based on processing the criterion priorities assigned to the selected test case selection criteria by the stakeholders;
presenting the candidate test plan to the plurality of stakeholders;
receiving from the plurality of stakeholders suggestions for revising the candidate test plan;
processing the stakeholder suggestions to automatically generate a suggested revision to the candidate test plan; and
presenting the suggested revision to the candidate test plan to at least one of the plurality of stakeholders.

7. The computer program product of claim 6, the method further comprising:
receiving from at least a first of the plurality of stakeholders at least one suggested change for revising the candidate test plan; and
receiving from at least a second of the plurality of stakeholders a user input accepting or denying the suggested change.

8. The computer program product of claim 6, the method further comprising:
receiving a user input from at least one of the plurality of stakeholders to finalize the candidate test plan; and
responsive to receiving the user input from the at least one of the plurality of stakeholders to finalize the candidate test plan, generating a final test plan from the candidate test plan.

9. The computer program product of claim 8, the method further comprising:
receiving a user input from the at least one of the stakeholders providing resource or planning information for the final test plan; and
incorporating the resource or planning information into the final test plan.

10. The computer program product of claim 8, the method further comprising:
presenting the final test plan to the at least one of the plurality of stakeholders and indicating in the final test plan, in real time, which of the test cases have been executed by a system being tested using the final test plan.

11. The computer program product of claim 10, the method further comprising:
indicating in the final test plan, in real time, whether the system being tested using the final test plan has passed or failed execution of the test cases that have been executed.

* * * * *